US012597388B2

(12) United States Patent
Ko et al.

(10) Patent No.: US 12,597,388 B2
(45) Date of Patent: Apr. 7, 2026

(54) DISPLAY DEVICE AND DRIVING METHOD THEREOF

(71) Applicant: LG Display Co., Ltd., Seoul (KR)

(72) Inventors: Namkon Ko, Paju-si (KR); Youngho Kim, Paju-si (KR); Miso Kim, Paju-si (KR); Nanyi Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/937,519

(22) Filed: Nov. 5, 2024

(65) Prior Publication Data

US 2025/0279048 A1 Sep. 4, 2025

(30) Foreign Application Priority Data

Feb. 29, 2024 (KR) ........................ 10-2024-0029524

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/027* (2013.01); *G09G 2310/0291* (2013.01); *G09G 2310/08* (2013.01)

(58) Field of Classification Search
CPC .... G09G 3/30–3291; G09G 2300/0809–0819; G09G 2300/0842; G09G 2300/0852; G09G 2300/0861; G09G 2310/0213; G09G 2310/027; G09G 2310/0291; G09G 2310/04; G09G 2310/067; G09G 2310/08; G09G 2320/10–106; G09G 2330/021–022; G09G 2340/0435; G09G 2340/16
See application file for complete search history.

(56) References Cited

U.S. PATENT DOCUMENTS

2021/0264856 A1* 8/2021 Chai .................... G09G 3/3258
2022/0157263 A1* 5/2022 Moon .................. G09G 3/3233
2022/0366835 A1* 11/2022 Park ..................... G09G 3/3233
2023/0099387 A1* 3/2023 Park ......................... G09G 3/32
2023/0105490 A1* 4/2023 Park ..................... G09G 3/3233
345/690
2023/0108303 A1* 4/2023 Xie ...................... G09G 3/3233
345/690
2023/0368736 A1* 11/2023 No ....................... G09G 3/3233
2023/0419882 A1* 12/2023 Lim ......................... G09G 3/32
(Continued)

*Primary Examiner* — Keith L Crawley
(74) *Attorney, Agent, or Firm* — Seed Intellectual Property Law Group LLP

(57) ABSTRACT

The present disclosure relates to a display device in which sub-pixels of a portion of a display panel are driven at a first frequency of a low frequency and sub-pixels of the other of the display panel are driven at a second frequency of a high frequency. A display device comprising: a display panel including a plurality of sub-pixels, a data driver configured to output one or more of a data voltage or an update voltage to the display panel, a gate driver configured to output one or more of a scan signal or an initialization signal to a sub-pixel of the display panel and a timing controller configured to output a timing control signal to the data driver and the gate driver, wherein the data voltage includes a voltage level corresponding to a gray value, and the update voltage includes a voltage level configured to swing between a turn-on level and a turn-off level.

19 Claims, 12 Drawing Sheets

(56) References Cited

U.S. PATENT DOCUMENTS

| | | | | |
|---|---|---|---|---|
| 2024/0127751 | A1* | 4/2024 | Choi | G09G 3/3233 |
| 2024/0274072 | A1* | 8/2024 | Li | G09G 3/3233 |
| 2025/0061833 | A1* | 2/2025 | Kawashima | H10D 86/60 |

* cited by examiner

DISPLAY DEVICE AND DRIVING METHOD THEREOF

CROSS REFERENCE TO RELATED APPLICATION

The present application claims priority to Korean Patent Application No. 10-2024-0029524, filed Feb. 29, 2024, the entire contents of which is incorporated herein for all purposes by this reference.

BACKGROUND

Technical Field

The present disclosure relates to a display device.

Description of the Related Art

Display devices may be mounted on electronic products or home appliances, such as televisions, monitors, laptop computers, smart phones, tablet computers, electronic pads, wearable devices, watches, navigation systems, or vehicle control display devices, and used as screens to display images.

A display device may display moving images. The moving images are displayed by converting still images on a frame basis. Recently, moving image sources are becoming increasingly high-definition, such as 4K and 8K. In particular, a faster change in scene is involved when images such as games are displayed.

Multiple screens may be displayed on the display device. For example, a background screen may be displayed, and videos may be displayed on a portion of the screen.

BRIEF SUMMARY

The present disclosure is directed to providing a display device, which may be driven at different frequencies for each part of a screen of the display device. The disclosure is directed to a display device, a portion of which may be driven at a low frequency and another portion of which may be driven at a high frequency. For example, a part on which videos are displayed may be driven at a high frequency, and a background part on which still images are displayed may be driven at a low frequency. Therefore, in the display device according to the present disclosure, a portion of one screen may be driven at the low frequency, and the other may be driven at the high frequency.

A display device according to the present disclosure may include a display panel including a plurality of sub-pixels, a data driver configured to output a data voltage and an update voltage to the display panel, a gate driver configured to output a scan signal and an initialization signal to the display panel, and a timing controller configured to output a timing control signal to the data driver and the gate driver, wherein the update voltage may be a signal swing between a turn-on level and a turn-off level, and the data voltage is a signal changed to a level corresponding to a gray value. Preferably, The update voltage may be applied to an update node, and when the update voltage has a turn-on level, the sub-pixel may be updated, and when the update voltage has a turn-off level, the sub-pixel is not updated and may be held.

DETAILED DESCRIPTION

Figure 1:
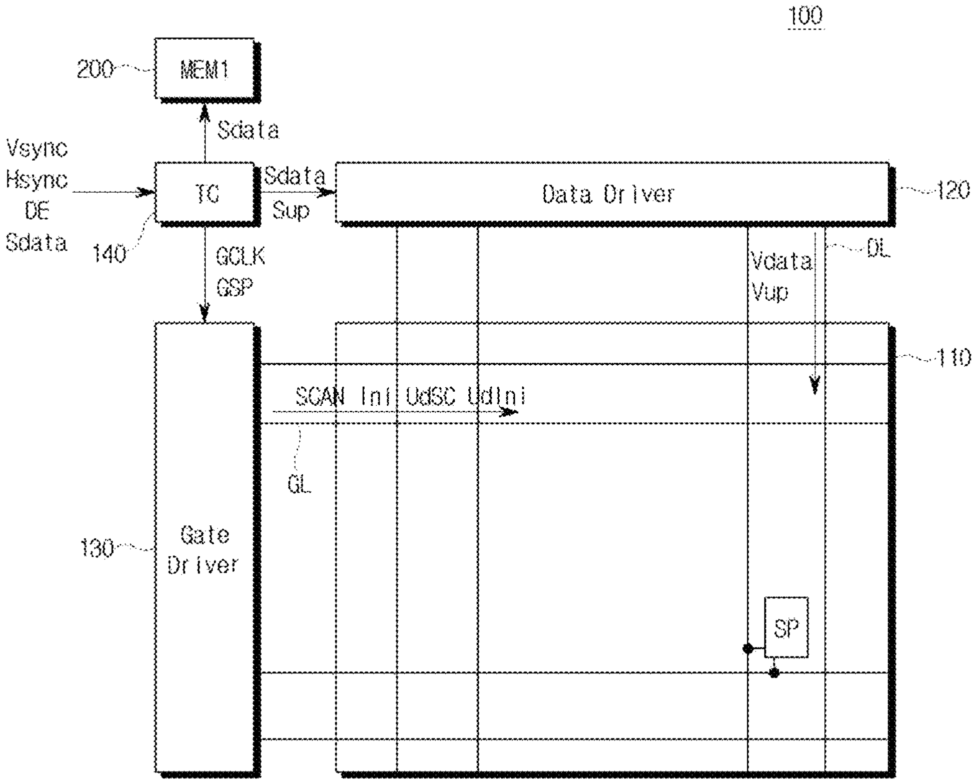
FIG. 1 is a view showing a display device according to the present disclosure.

Technical characteristics and features of the present disclosure and methods for achieving them will become clear with reference to embodiments described below in detail in conjunction with the accompanying drawings. However, the present disclosure is not limited to the embodiments disclosed below but can be implemented in various different forms, the embodiments are merely provided to make the disclosure of the present disclosure complete and fully inform those skilled in the art to which the present disclosure pertains of the scope of the present disclosure.

Since shapes, sizes, ratios, angles, numbers, and the like disclosed in the drawings for describing the embodiments of the present disclosure are illustrative, the present disclosure is not limited to the illustrated items. The same reference number indicates the same components throughout the specification. In addition, in describing the present disclosure, when it is determined that the detailed description of a related known technology may unnecessarily obscure the gist of the present disclosure, detailed description thereof will be omitted. When terms “comprises,” “has,” “consists of,” and the like described in the present specification are used, other parts may be added unless “only” is used. When a component is expressed in the singular, it includes a case in which the component is provided as a plurality of components unless specifically stated otherwise.

In construing a component, the component is construed as including the margin of error even when there is no separate explicit description.

When the positional relationship is described, for example, when the positional relationship between two parts is described using the term “on,” “above,” “under,” “next to,” or the like, one or more other parts may be positioned between the two parts unless the term “immediately” or “directly” is used.

When an element or a layer is described as being disposed “on” another element or layer, it includes both a case in which the element or the layer is disposed directly on another element or layer and a case in which other layers or elements are interposed therebetween.

Although terms such as first and second are used to describe various components, the components are not limited by the terms. The terms are only used to distinguish one component from another. Therefore, a first component described below may be a second component within the technical spirit of the present disclosure.

The same reference number indicates the same components throughout the specification.

The size and thickness of each component shown in the drawings are shown for convenience of description, and the present disclosure is not necessarily limited to the sizes and thicknesses of the components shown.

Features of various embodiments of the present disclosure can be partially or fully coupled or combined, and as can be fully understood by those skilled in the art, various technical interconnections and operations are possible, and the embodiments can be implemented independently of each other and implemented together in combination thereof.

Hereinafter, embodiments according to the present disclosure will be described in detail with reference to the accompanying drawings.

In the present disclosure, "display device" may include display devices, such as liquid crystal modules (LCMs), organic light emitting diode (OLED) modules, and quantum dot (QD) modules, which include a display panel and a driver for driving the display panel, in a narrow sense. In addition, the display device may also include equipment display devices including laptop computers, televisions, computer monitors, automotive displays, or other forms for a vehicle that are complete products or final products including the LCMs, the OLED modules, the QD modules, or the like, and set electronic devices or set devices, such as mobile electronic devices such as smartphones or electronic pads.

Therefore, the display device in the present disclosure may include the display devices themself in the narrow sense, such as the LCMs, the OLED modules, or the QD modules, and set devices that are application products or end-consumer devices including the LCMs, the OLED modules, or the QD modules.

In addition, in some cases, the LCMs, the OLED modules, and the QD modules composed of the display panel, the driver, and the like are represented by "display device" in the narrow sense, and the electronic devices as final products including the LCMs, the OLED modules, and the QD modules may be separately represented by "set devices." For example, the display device in the narrow sense may be a concept including a display panel of the LCD, the OLED, or the QD and a source printed circuit board (PCB) that is a controller for driving the display panel and further includes a set PCB that is a set controller electrically connected to the source PCB to control the entire set device.

The display panel used in the present embodiment may use any type of display panels, such as LCD panels, OLED display panels, QD display panels, and electroluminescent display panels and is not limited to a specific display panel capable of bezel bending with a flexible substrate for an OLED display panel of the present embodiment and a back plate support structure thereunder. In addition, the display panel used in the display device according to the embodiment of the present disclosure is not limited to the shape or size of the display panel.

For example, when the display panel is the OLED display panel, the display panel may include a plurality of gate lines and data lines, and pixels formed in intersection areas of the gate lines and the data lines. In addition, the display panel may include an array including a thin film transistor that is an element for selectively applying a voltage to each pixel, an OLED layer disposed on the array, an encapsulation substrate or an encapsulation layer disposed on the array to cover the OLED layer, and the like. The encapsulation layer can protect the thin film transistor, the OLED layer, and the like from an external impact and prevent moisture or oxygen from permeating the OLED layer. In addition, the layer formed on the array may include an inorganic light emitting layer, such as a nano-sized material layer or quantum dots.

FIG. 1 is a view showing a display device according to the present disclosure.

Referring to FIG. 1, a display device 100 includes a display panel 110, a data driver 120, a gate driver 130, a timing controller 140, and a memory 200.

The display panel 110 includes a plurality of gate lines GL and a plurality of data lines DL. A plurality of sub-pixels SP are disposed at locations at which the gate lines GL and the data lines DL intersect. The display panel 110 receives a data voltage Vdata from the data driver 120 through the data line DL. In addition, the display panel 110 receives an update voltage Vup from the data driver 120 through the data line DL. The display panel 110 receives a scan signal SCAN from the gate driver 130 through the gate line GL. In addition, the display panel 110 receives an initialization signal Ini, an update scan signal UdSC, and an update initialization signal UdIni from the gate driver 130 through the gate line GL. The gate line GL may be composed of a plurality of lines, and each line may receive any one of the scan signal SCAN, the initialization signal Ini, the update scan signal UdSC, and the update initialization signal UdIni. Alternatively or additionally, the gate line GL may be configured to asynchronously receive two or more among the scan signal SCAN, the initialization signal Ini, the update scan signal UdSC, and the update initialization signal UdIni as one line.

The data driver 120 receives image data Sdata from the timing controller 140. The image data Sdata is serial data and includes information about a gray value at which each sub-pixel SP should emit light. The data driver 120 converts the image data Sdata into an analog data voltage Vdata and outputs the analog data voltage Vdata to the data line DL. In addition, the data driver 120 receives update data Sup from the timing controller 140. The update data Sup is serial data and may control whether each sub-pixel SP should be updated or held without updating. The data driver 120 converts the update voltage (the update data) Vup into an analog update voltage Vup and outputs the analog update voltage Vup to the data line DL. The data line DL may be composed of a plurality of lines, and each line may receive the data voltage Vdata and the update voltage Vup. Alternatively or additionally, the data line DL may be configured to asynchronously receive the data voltage Vdata and the update voltage Vup as one line. The data driver 120 will be described below with reference to FIG. 3.

The gate driver 130 outputs signals for controlling several transistors disposed in the sub-pixel SP to the display panel 110. The gate driver 130 outputs the scan signal SCAN, the initialization signal Ini, the update scan signal UdSC, and the update initialization signal UdIni to the display panel 110. The gate driver 130 may be located at only one side or both sides of the display panel 110 in the form of one or more integrated circuits (ICs). The gate driver 130 may be implemented in the form of a gate in panel (GIP) directly embedded in a non-display area of the display panel 110. The gate driver 130 will be described below with reference to FIG. 4.

The timing controller 140 controls the operations of the data driver 120 and the gate driver 130 by supplying various signals to the data driver 120 and the gate driver 130. The signals are signals for controlling the operation timings of the data driver 120 and the gate driver 130, and thus may be referred to as "timing control signals." The timing controller 140 receives a vertical synchronization signal Vsync, a horizontal synchronization signal Hsync, and a data enable signal DE from the outside (or a set system). The vertical synchronization signal Vsync, the horizontal synchronization signal Hsync, and the data enable signal DE are signals for controlling the timing of the display panel 110. In addition, the timing controller 140 may receive the image data Sdata from the external set system. The timing controller 140 may write the image data Sdata in the memory 200. The timing controller 140 may read the image data Sdata written in the memory 200 and output the image data Sdata to the data driver 120. The timing controller 140 may output a gate clock GCLK and a gate start pulse GSP to the gate driver 130.

The memory 200 may receive and store the image data Sdata from the timing controller 140. The image data Sdata may be divided on a frame basis and may be a gray value assigned to each sub-pixel within each frame. The memory 200 may be referred to as "frame memory." The memory 200 may be a NAND type memory. The image data Sdata stored in the memory 200 may be read and output to the data driver 120 by the timing controller 140.

Figure 2:
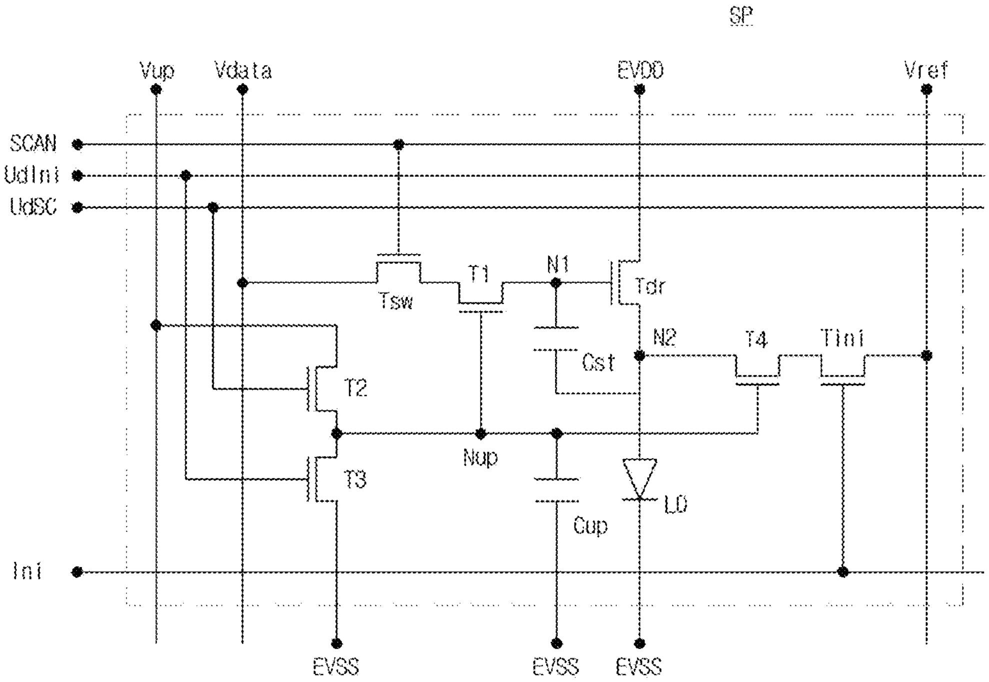
FIG. 2 is a circuit diagram showing a sub-pixel according to the present disclosure.

FIG. 2 is a circuit diagram showing a sub-pixel according to the present disclosure.

Referring to FIG. 2, the data voltage Vdata and the update voltage Vup are applied to the sub-pixel SP. The data voltage Vdata and the update voltage Vup may be applied through the data line.

A high potential voltage EVDD and a low potential voltage EVSS are applied to the sub-pixel SP. The high potential voltage EVDD is a high level voltage for driving a light emitting element LD. The low potential voltage EVSS is a low level voltage at which the current passing through the light emitting element LD is output. The high potential voltage EVDD and the low potential voltage EVSS may be applied through power lines.

A reference voltage Vref is applied to the sub-pixel SP. The reference voltage Vref is a low level voltage for initializing a second node N2, which is a source node of a driving transistor Tdr. The reference voltage Vref may be referred to as "initialization voltage." In the present disclosure, the reference voltage Vref and the initialization voltage Vref may be used interchangeably. The reference voltage Vref may be applied through the data line. Alternatively or additionally, the reference voltage Vref may be provided to the sub-pixel SP through a separate power line.

The scan signal SCAN, the initialization signal Ini, the update scan signal UdSC, and the update initialization signal UdIni are applied to the sub-pixel SP. The signals may be applied through the gate line.

A switching transistor Tsw is controlled by the scan signal SCAN to connect the data voltage Vdata with a first node N1. The first node N1 is connected to a gate node of the driving transistor Tdr and connected to one electrode of a storage capacitor Cst. When the switching transistor Tsw is turned on, the data voltage Vdata is applied to the first node N1 and the storage capacitor Cst.

The driving transistor Tdr is controlled by the first node N1 to connect the high potential voltage EVDD with the second node N2. The second node N2 is connected to a source node of the driving transistor Tdr and the other electrode of the storage capacitor Cst. The driving transistor Tdr passes a current corresponding to a voltage stored in the storage capacitor Cst. The current passing through the driving transistor Tdr allows the light emitting element LD to emit light.

The storage capacitor Cst has one electrode connected to the first node N1 and the other electrode connected to the second node N2. A data voltage is applied to one electrode of the storage capacitor Cst, and the reference voltage (or the initialization voltage) Vref is applied to the other electrode.

An initialization transistor Tini is controlled by the initialization signal Ini to connect the reference voltage Vref with the second node N2. When the initialization transistor Tini is turned on, the reference voltage Vref is applied to the second node N2. When the reference voltage Vref is applied to the second node N2, the other electrode of the storage capacitor Cst is initialized.

The light emitting element LD is disposed between the second node N2 and the low potential voltage EVSS. When a current is output from the driving transistor Tdr to the light emitting element LD, the light emitting element LD emits light with luminance corresponding to the current.

A first transistor T1 is controlled by the update node Nup to connect the switching transistor Tsw with the first node N1. When the first transistor T1 is turned on, the data voltage Vdata output from the switching transistor Tsw may be applied to the first node N1. When the first transistor T1 is turned off, the data voltage Vdata is not applied to the first node N1 and is blocked.

A second transistor T2 is controlled by the update scan signal UdSC to connect the update voltage Vup with the update node Nup. When the second transistor T2 is turned on, the update voltage Vup may be applied to the update node Nup. When the second transistor T2 is turned off, the update voltage Vup is not applied to the update node Nup and is blocked.

A third transistor T3 is controlled by the update initialization signal UdIni to connect the update node Nup with the low potential voltage EVSS. When the third transistor T3 is turned on, the update node Nup is connected to the low potential voltage EVSS, and thus the update node Nup is initialized.

A fourth transistor T4 is controlled by the update node Nup to connect the initialization transistor Tini with the second node N2. When the fourth transistor T4 is turned on, the reference voltage Vref output from the initialization transistor Tini may be output to the second node N2. When the fourth transistor T4 is turned off, the initialization of the second node N2 is blocked.

An update capacitor Cup has one electrode connected to the update node Nup and the other electrode connected to the low potential voltage EVSS. When a turn-on level voltage is applied to the update node Nup through the second transistor T2, the update capacitor Cup maintains the turn-on level voltage. When a turn-off level voltage (i.e., the low potential voltage EVSS) is applied to the update node Nup through the third transistor T3, the update capacitor Cup maintains the turn-off level voltage.

As shown in FIG. 2, the transistors are shown as N type. However, the transistors may also be formed as P-type.

Figure 3:
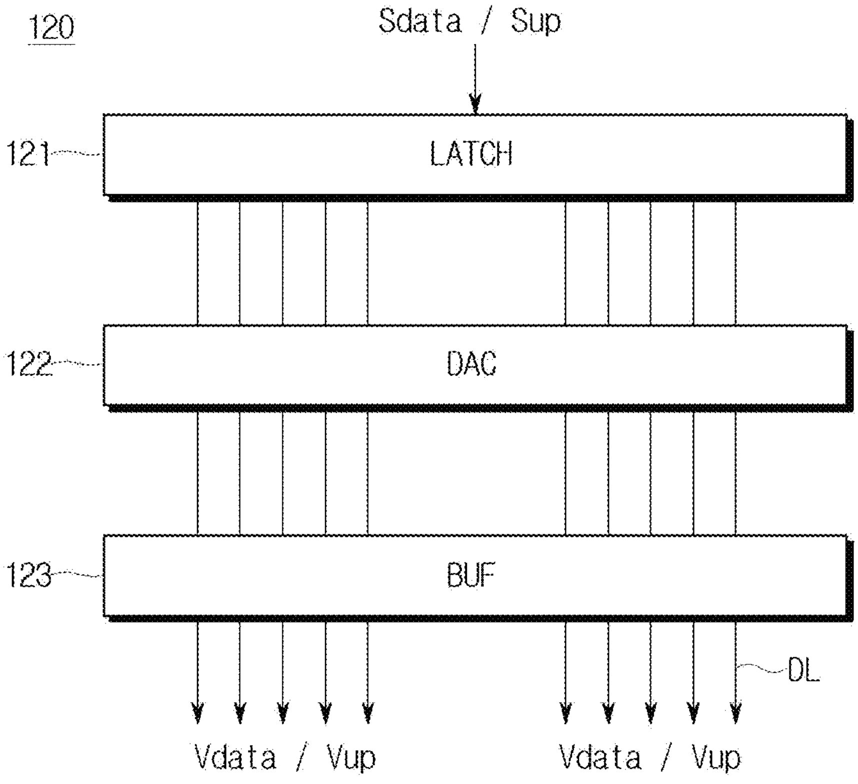
FIG. 3 is a view for describing a data driver according to the present disclosure.

FIG. 3 is a view for describing a data driver according to the present disclosure.

Referring to FIG. 3, the data driver 120 includes a latch 121, a converter 122, and a buffer 123.

The latch 121 receives the digital image data Sdata from the timing controller 140. The image data Sdata may be transmitted in the form of a data packet including a clock. The latch 121 parallelizes serially input image data Sdata.

The latch 121 receives the digital update data Sup from the timing controller 140. The update data Sup may be transmitted in the form of a data packet including a clock. The latch 121 parallelizes the serially input update data Sup.

When a source output enable signal is input from the timing controller 140, the latch 121 outputs the image data Sdata or the update data Sup to the converter 122. The source output enable signal is a signal for defining one horizontal line. In other words, when the image data Sdata or the update data Sup that corresponds to one horizontal line is applied, the source output enable signal is input. Therefore, the serial data may be parallelized by the source output enable signal.

The converter 122 is a digital-to-analog converter for converting a digital signal into an analog signal. The converter 122 converts the data Sdata and Sup input from the latch 121 from a digital format to an analog format. Data output from the converter 122 may have a voltage level boosted by a gamma converter (not shown) and a level shifter (not shown).

The buffer 123 outputs the data voltage Vdata to the data line DL through an output buffer disposed in each channel of the data driver 120. In addition, the buffer 123 outputs the update voltage Vup to the data line DL or a separate signal line through an output buffer disposed for each channel of the data driver 120. The separate signal line may be a line connected from the data driver 120 to the display panel 110, such as the data line DL. In some cases, the data voltage Vdata and the update voltage Vup may be output to one data line DL. The data voltage Vdata and the update voltage Vup are applied to each sub-pixel, which causes images to be displayed on a screen of the display device.

Figure 4:
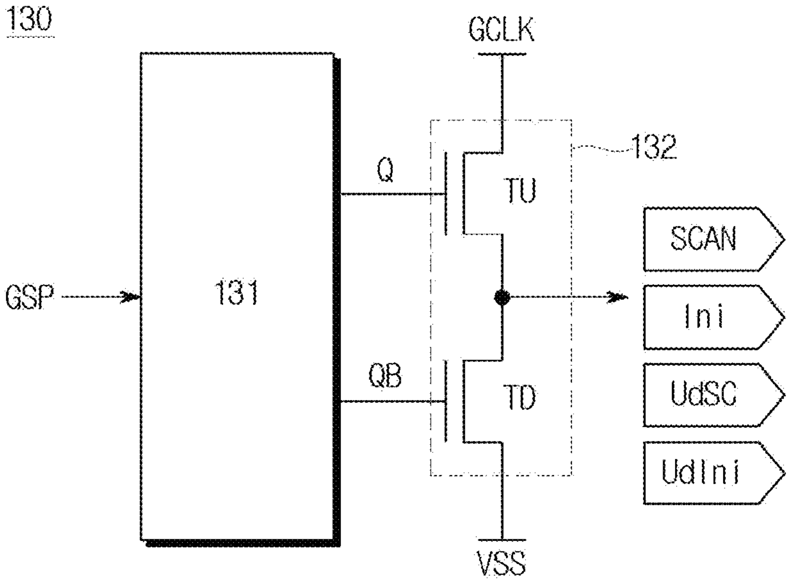
FIG. 4 is a view for describing a gate driver according to the present disclosure.

FIG. 4 is a view for describing a gate driver according to the present disclosure.

Referring to FIG. 4, the gate driver 130 includes a shift register 131 and a buffer circuit 132.

The gate driver 130 receives a gate start pulse GSP from the timing controller 140. The gate driver 130 receives a gate clock GCLK from the timing controller 140. The signal output from the buffer circuit 132 is output to the gate line. The signal output to the gate line include the scan signal SCAN, the initialization signal Ini, the update scan signal UdSC, and the update initialization signal UdIni.

The scan signal SCAN will be mainly described. When the scan signal SCAN is output to a first gate line GL by the gate start pulse GSP, the next shift register 131 is operated by a carry operation. The scan signal SCAN is output to a second gate line GL by an operation of the next shift register 131. Therefore, the scan signals SCAN of all gate lines GL of the display panel 110 may be output sequentially by the operations of the gate start pulse GSP and the gate clock GCLK.

For example, the shift register 131 may control a Q node and a QB node that are connected to the buffer circuit 132. Voltage states of the Q node and the QB node are changed depending on the operating state of the shift register 131. Depending on the states of the Q node and the QB node, the turn-on and turn-off of a pull-up transistor TU and a pull-down transistor TD are controlled. According to such control, the scan signal SCAN at a high level or low level may be output.

The initialization signal Ini, the update scan signal UdSC, and the update initialization signal UdIni may be output in the same manner that the scan signal SCAN is output.

Figure 5:
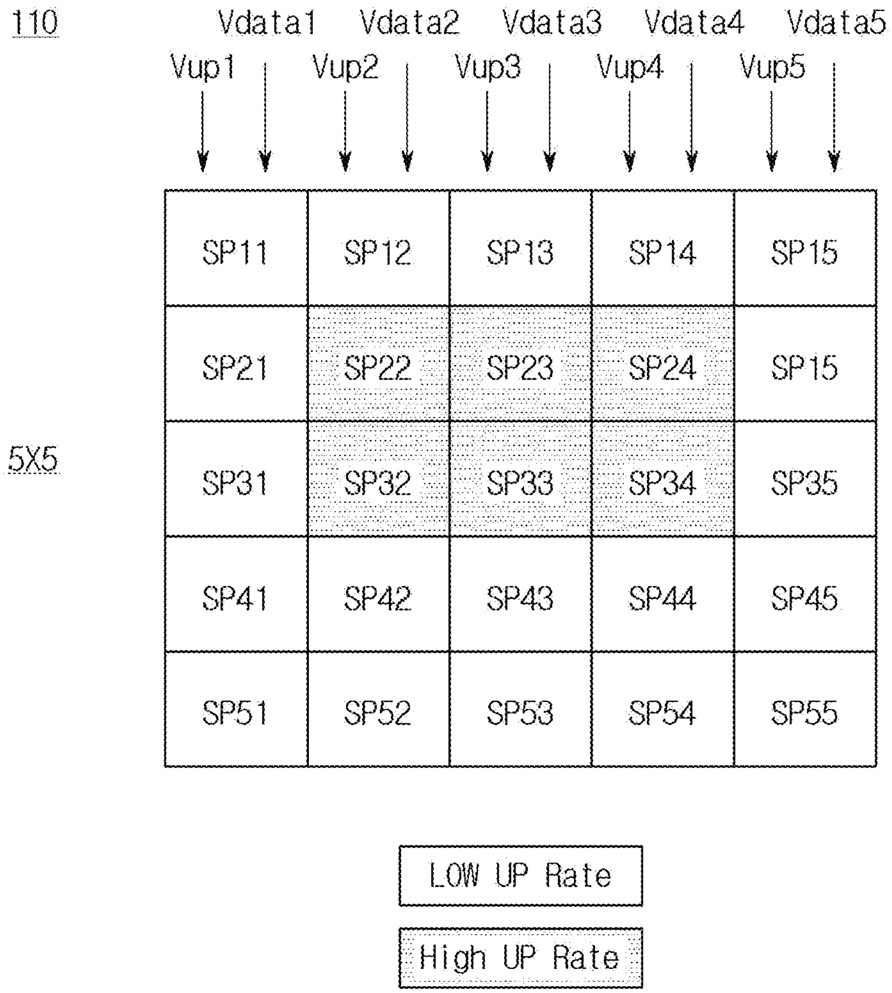
FIG. 5 is a view showing an output screen of the display device according to the present disclosure.

FIG. 5 is a view showing an output screen of the display device according to the present disclosure.

Figure 6:
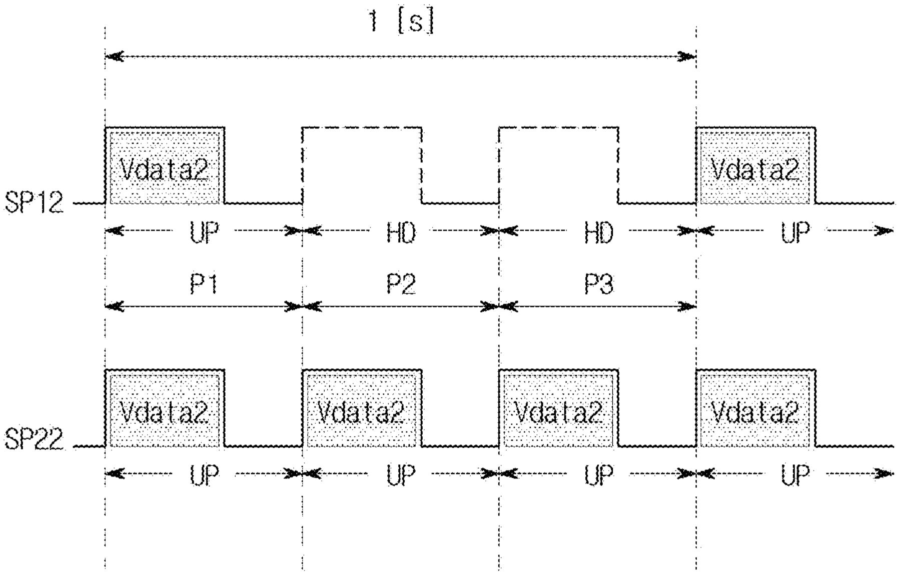
FIG. 6 is a timing diagram for describing an update operation and a holding operation of a sub-pixel according to the present disclosure.

FIG. 6 is a timing diagram for describing an update operation and a holding operation of a sub-pixel according to the present disclosure.

Figure 7:
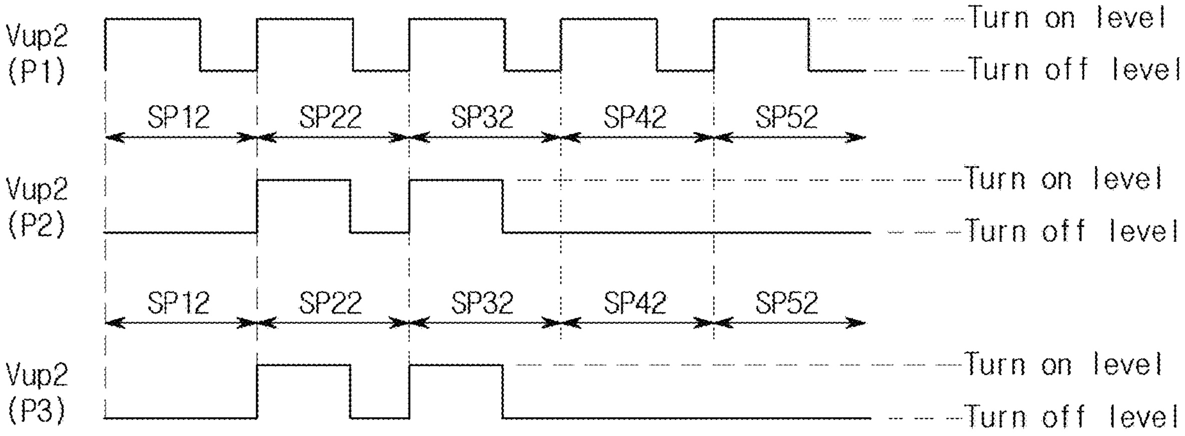
FIG. 7 is a timing diagram showing an update voltage applied to sub-pixels according to the present disclosure.

FIG. 7 is a timing diagram showing an update voltage applied to sub-pixels according to the present disclosure.

Figure 8:
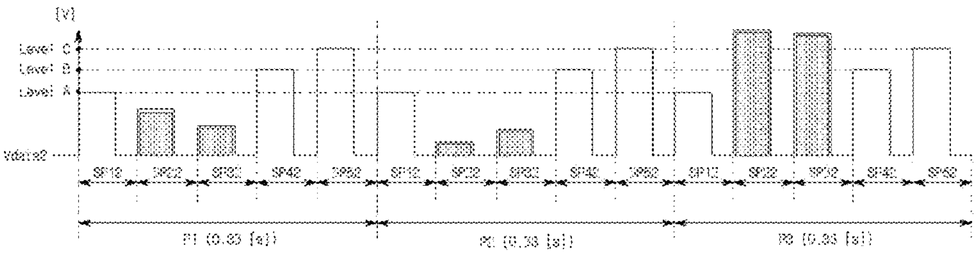
FIG. 8 is a timing diagram showing a data voltage applied to the sub-pixels according to the present disclosure.

FIG. 8 is a timing diagram showing a data voltage applied to the sub-pixels according to the present disclosure.

To more clearly describe the technical spirit according to the present disclosure, an example in which the display panel 110 includes 5×5 sub-pixels for illustrative purposes will be described. The technical spirit described in the present disclosure may be applied to a display device including a larger number of sub-pixels, such as the 3840×2160 display panel 110 that displays UHD quality images in the same manner.

In addition, to more clearly describe the technical spirit according to the present disclosure, a frequency is used by being replaced with the term, such as a refresh rate or an update rate.

In addition, to more clearly describe the technical spirit according to the present disclosure, an example in which a high frequency High Update Rate is 3 Hz and a low frequency Low Update Rate is 1 Hz will be described. The technical spirit described in the present disclosure may be applied to higher frequencies, such as 60 Hz, 120 Hz, 240 Hz, and 480 Hz, in the same manner.

Referring to FIG. 5, the display panel 110 includes a total of 25 sub-pixels SP11 to SP55. Among them, some sub-pixels SP22, SP23, SP24, SP32, SP33, and SP34 operate at a high frequency. The remaining sub-pixels SP11 to SP15, SP21, SP25, SP31, SP35, SP41 to SP45, and SP51 to SP55 operate at a low frequency.

To control the high or low frequency, update voltages Vup1 to Vup5 are applied to the sub-pixels SP through data lines. Data voltages Vdata1 to Vdata5 are applied to the sub-pixels SP through data lines.

Videos may be displayed on the sub-pixels SP22, SP23, SP24, SP32, SP33, and SP34 driven at the high frequency. Still images may be displayed on the sub-pixels SP11 to SP15, SP21, SP25, SP31, SP35, SP41 to SP45, and SP51 to SP55 driven at the low frequency. For example, on a computer screen, videos may be displayed in the sub-pixels SP22, SP23, SP24, SP32, SP33, SP34 of a reduced window rather than full screen. The remaining sub-pixels may display still images, such as a desktop screen.

Therefore, the display panel 110 may be driven at different frequencies for each part. In other words, some SP11 to SP15, SP21, SP25, SP31, SP35, SP41 to SP45, and SP51 to SP55 among the plurality of sub-pixels SP may operate at a first frequency corresponding to a low frequency. The others SP22, SP23, SP24, SP32, SP33, and SP34 among the plurality of sub-pixels SP may operate at a second frequency corresponding to a high frequency.

Referring to FIG. 6, update and holding timings of the two sub-pixels SP12 and SP22 shown in FIG. 5 are shown. A data voltage Vdata2 is input to the sub-pixels SP12, SP22, SP32, SP42, and SP52 shown in FIG. 5.

It is assumed that the sub-pixel SP12 is a sub-pixel driven at the low frequency and the low frequency is 1 Hz for illustrative purposes. The sub-pixel SP12 is updated UP during a first period P1 of a period of 1 second. The sub-pixel SP12 is held HD without being updated during a second period P2 and a third period P3.

The update UP indicates a case where a new data voltage is input to the storage capacitor Cst of the sub-pixel SP and the sub-pixel SP emits light at the new data voltage. The holding HD indicates a case where a past data voltage input to the storage capacitor Cst during the previous period is maintained as it is and the sub-pixel SP emits light at the past data voltage.

It is assumed that the sub-pixel SP22 is a sub-pixel driven at the high frequency and the high frequency is 3 Hz for illustrative purposes. The sub-pixel SP22 is updated UP during the first period P1, the second period P2, and the third period P3 of a period of 1 second.

Referring to FIG. 5, the sub-pixels SP12, SP22, SP32, SP42, and SP52 share a data line or a predetermined signal line. An update voltage Vup2 is applied through the shared signal line. Referring to FIG. 7, the timing of the update voltage Vup2 is shown.

As shown in FIG. 7, all sub-pixels SP12, SP22, SP32, SP42, and SP52 are updated during the first period P1. Therefore, the update voltage Vup2 transitions a total of 5 times during the first period P1. The transition indicates a change in level of the second update voltage Vup2 from the turn-off level to the turn-on level.

During the second period P2, some sub-pixels PS12, SP42, and SP52 driven at the low frequency are held, and some sub-pixels SP22 and SP32 driven at the high frequency are updated. Therefore, the update voltage Vup2 transitions a total of 2 times during the second period P2. The transitioned turn-on level is applied to the sub-pixels SP22 and SP32 during the second period P2.

Driving during the third period P3 is the same as driving during the second period P2.

As described above, the update voltage Vup is a voltage that swings between the turn-on level and the turn-off level. As described above with reference to FIG. 2, the update voltage Vup is a voltage that determines whether the voltage applied to the update node Nup is a turn-on level or a turn-off level. When the update voltage Vup is at the turn-on level, the first transistor T1 and the fourth transistor T4 that are controlled by the update node Nup are turned on, and when the update voltage Vup is at the turn-off level, the first transistor T1 and the fourth transistor T4 are turned off. Therefore, the update voltage Vup may be implemented as a voltage that swings between two levels.

Referring to FIG. 8, the data voltage Vdata2 applied during the first period P1, the second period P2, and the third period P3 is shown. Each of the periods P1, P2, and P3 has a period of about 0.33 seconds. The data voltage Vdata2 is a voltage indicating a gray at which each sub-pixel SP connected to the data line should emit light. Since the gray has a value between 0 and 255 gray, the data voltage Vdata has a voltage level that changes over a wide spectrum corresponding to the entire gray. As described above, it differs from the fact that the update voltage Vup swings between two values: the turn-on level and the turn-off level.

Specifically, the first period P1 is a period in which all sub-pixels SP12, SP22, SP32, SP42, and SP52 are updated. The gray value of each sub-pixel SP is shown as an example.

The second period P2 is a period in which the sub-pixels SP22 and SP32 are updated and the sub-pixels SP12, SP42, and SP52 are held. Therefore, the sub-pixels SP12, SP42, and SP52 are sub-pixels driven at the low frequency, and the sub-pixels SP22 and SP32 are sub-pixels driven at the high frequency. Therefore, the data voltage Vdata2 applied to the sub-pixels SP12, SP42, and SP52 driven and held at the low frequency is the same as the data voltage Vdata2 input during the first period P1. For example, a level of the data voltage Vdata2 applied to the sub-pixel SP12 during the first period P1 and the second period P2 is Level A. A level of the data voltage Vdata2 applied to the sub-pixel SP42 during the first period P1 and the second period P2 is Level B. A level of the data voltage Vdata2 applied to the sub-pixel SP52 during the first period P1 and the second period P2 is Level C. In contrast, the data voltages Vdata2 applied to the sub-pixels SP22 and SP32 driven and updated at the high frequency differ from each other during the first period P1 and the second period P2. The voltage levels of the sub-pixels SP22 and SP32 shown in FIG. 8 are illustrative.

Like the second period P2, the third period P3 is a period in which the sub-pixels SP22 and SP32 are updated and the sub-pixels SP12, SP42, and SP52 are held. The data voltages Vdata2 applied to the sub-pixels SP12, SP42, and SP52 driven and held at the low frequency are the same as the data voltage Vdata2 input during the second period P2. The data voltages Vdata2 applied to the sub-pixels SP22 and SP32 driven and updated at the high frequency differ from each other during the second period P2 and the third period P3. The voltage levels of the sub-pixels SP22 and SP32 shown in FIG. 8 are illustrative.

As a result, the data voltage Vdata2 is a voltage that changes to the level corresponding to the gray value.

Figure 9:
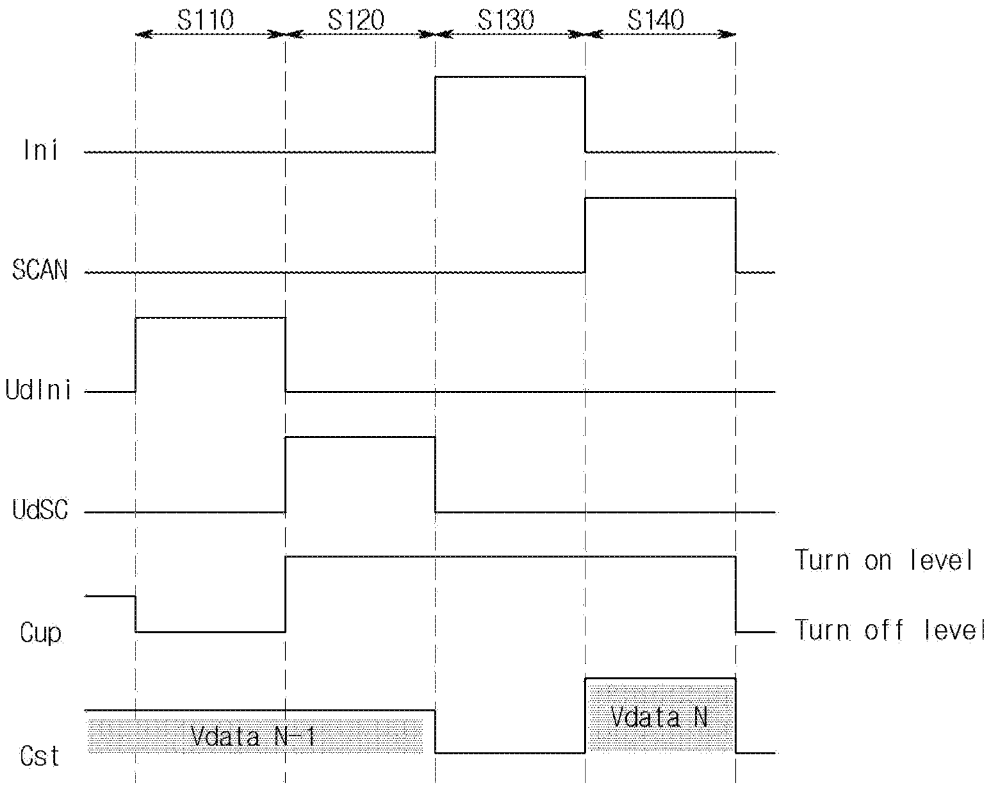
FIG. 9 is a view showing the timing for updating the sub-pixel according to the present disclosure.

FIG. 9 is a view showing the timing for updating the sub-pixel according to the present disclosure.

FIGS. 10 to 13 are views showing an operation of the sub-pixel updated according to the timing of FIG. 9.

For example, the sub-pixels SP described in FIGS. 9 to 13 may be the sub-pixels P22, P23, P24, P32, P33, and P34 driven at high frequencies among the sub-pixels shown in FIG. 5 and may have the timings during the first period P1, the second period P2, and the third period P3 among the periods shown in FIGS. 6 to 8. The update voltage Vup applied to the sub-pixels during such a period is the turn-on level.

In addition, for example, the sub-pixels SP described in FIGS. 9 to 13 may be the sub-pixels SP11, SP12, SP13, SP14, SP15, SP21, SP25, SP31, SP35, SP41, SP42, SP43, SP44, SP45, SP51, SP52, SP53, SP54, and SP55 driven at low frequencies among the sub-pixels shown in FIG. 5 and may have the timing during the first period P1 among the periods shown in FIGS. 6 to 8. The update voltage Vup applied to the sub-pixels during such a period is the turn-on level.

Referring to FIG. 9, periods S110, S120, S130, and S140 are shown.

Figure 10:
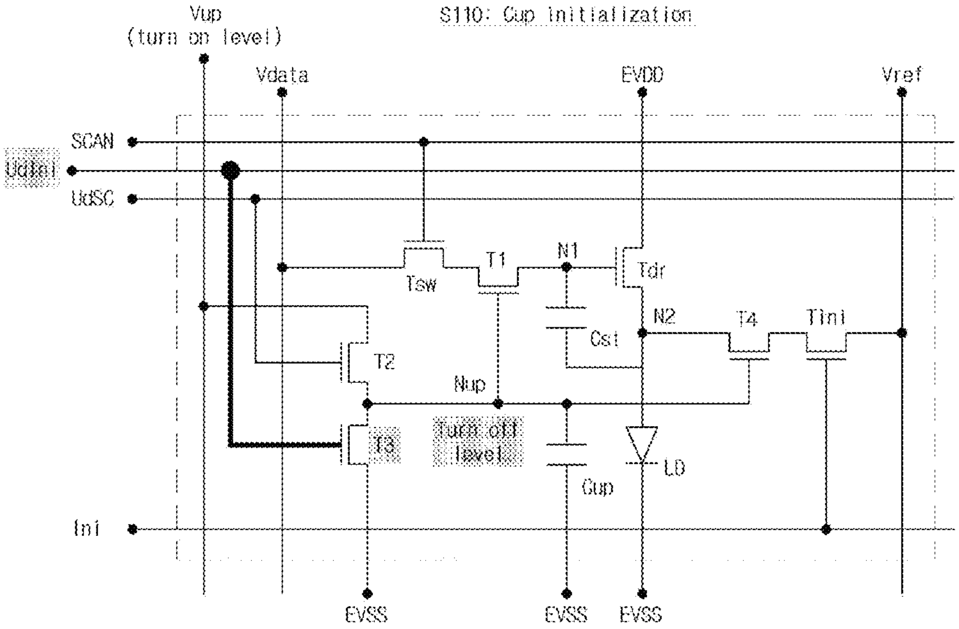
FIGS. 10 to 13 are views showing an operation of the sub-pixel updated according to the timing of FIG. 9.

The first period S110 is a period for initializing the update capacitor Cup, and the state of the sub-pixel SP is shown in FIG. 10.

Figure 11:
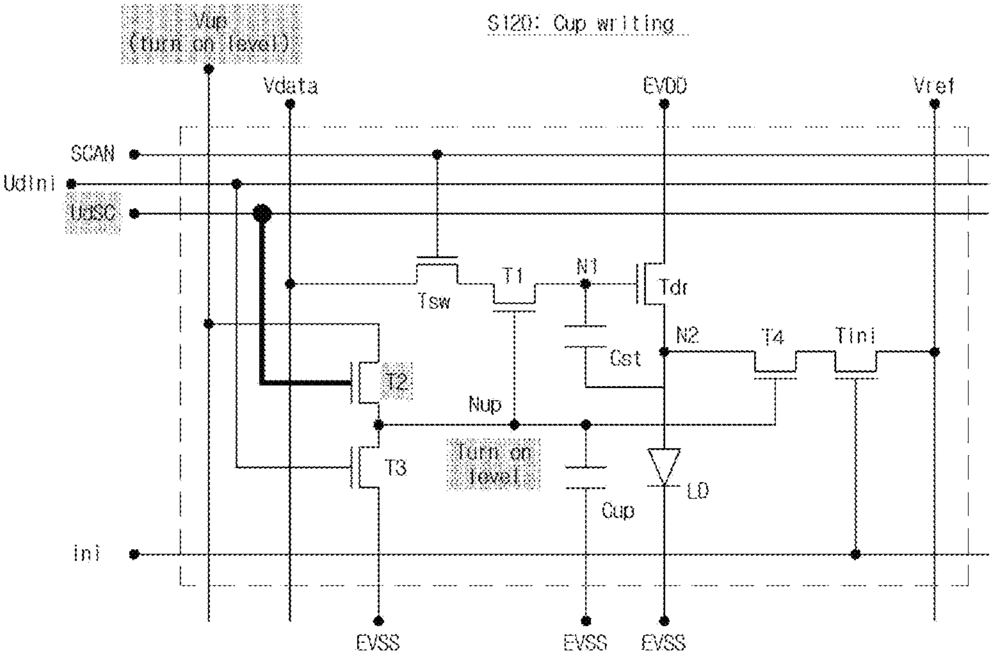

The second period S120 is a period in which the update voltage Vup is input to the update capacitor Cup, and the state of the sub-pixel SP is shown in FIG. 11.

Figure 12:
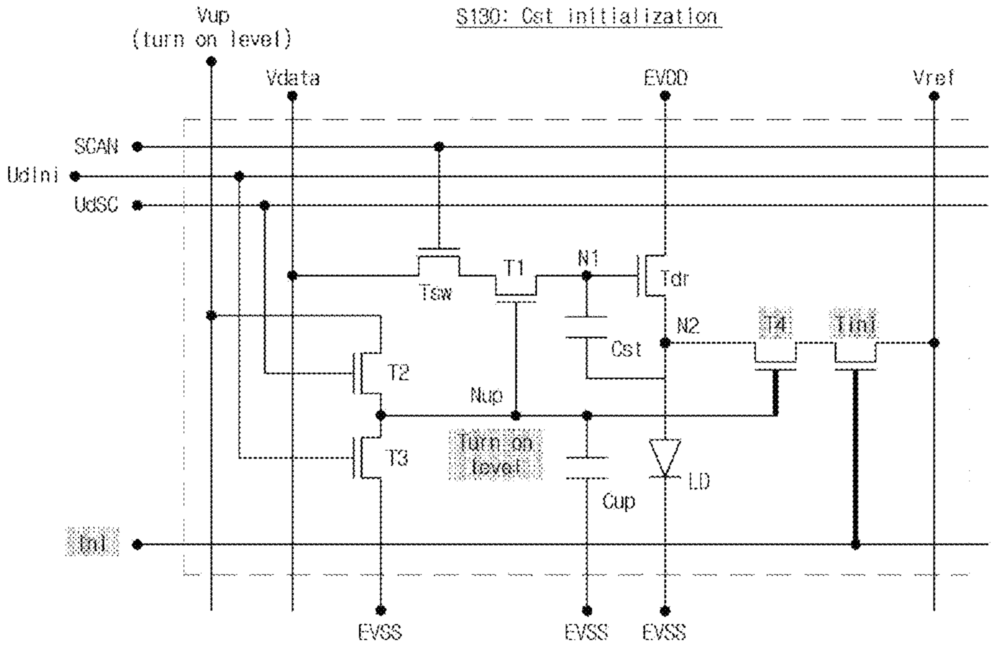

The third period S130 is a period for initializing the storage capacitor Cst, and the state of the sub-pixel SP is shown in FIG. 12.

Figure 13:
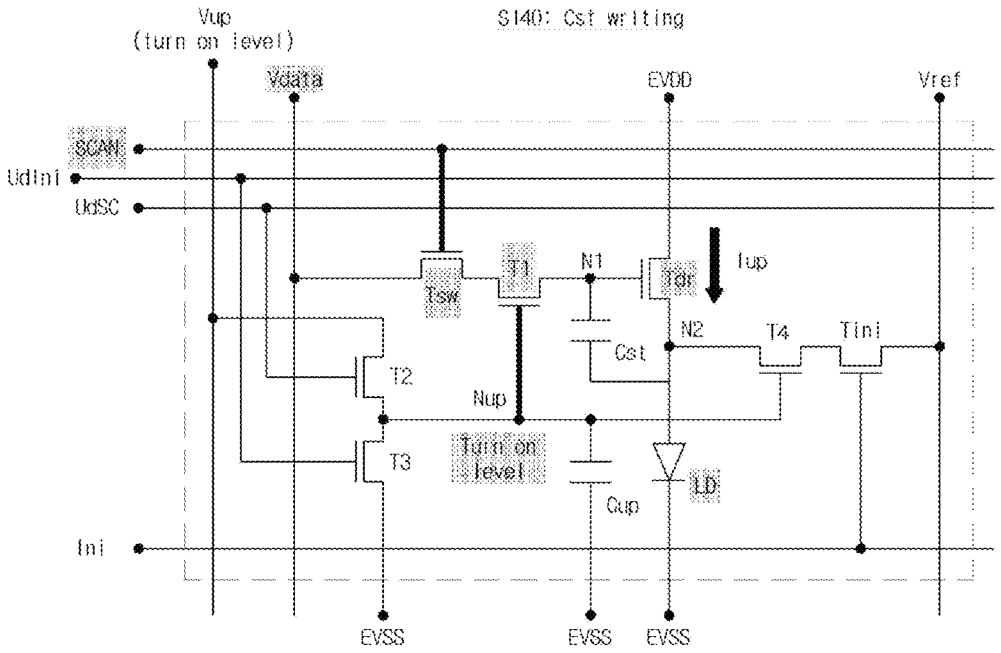

The fourth period S140 is a period in which the data voltage Vdata is input to the storage capacitor Cst, and the state of the sub-pixel SP is shown in FIG. 13.

Referring to FIG. 10, the update initialization signal UdIni is applied during the first period S110. The initialization signal UdIni turns on the third transistor T3. The low potential voltage EVSS is applied to the update node Nup through the third transistor T3. The update node Nup becomes the turn-off level by receiving the low potential voltage EVSS. The update capacitor Cup is initialized to the turn-off level.

Referring to FIG. 11, the update scan signal UdSC is applied during the second period S120. The update scan signal UdSC turns on the second transistor T2. The update voltage Vup is applied to the update node Nup through the second transistor T2. The update voltage Vup is the turn-on level. Therefore, the update node Nup becomes the turn-on level. The turn-on level voltage is applied to the update capacitor Cup.

Referring to FIG. 12, the initialization signal Ini is applied during the third period S130. The initialization signal Ini turns on the initialization transistor Tini. The update node Nup maintains the turn-on level voltage stored in the update capacitor Cup. Therefore, the fourth transistor T4 is turned on. Therefore, the reference voltage Vref is applied to the second node N2, and the storage capacitor Cst is initialized. For example, a past data voltage Vdata N−1 stored in the storage capacitor Cst is initialized.

Referring to FIG. 13, the scan signal SCAN is applied during the fourth period S140. The scan signal SCAN turns on the switching transistor Tsw. The update node Nup maintains the turn-on level voltage stored in the update capacitor Cup. Therefore, the first transistor T1 is turned on. Therefore, the data voltage Vdata is applied to the first node N1, and the data voltage Vdata is applied to the storage capacitor Cst. For example, a new data voltage Vdata N is stored in the storage capacitor Cst. Since a current Iup passing through the driving transistor Tdr becomes an updated current, an updated image is displayed on the display panel 110.

Figure 14:
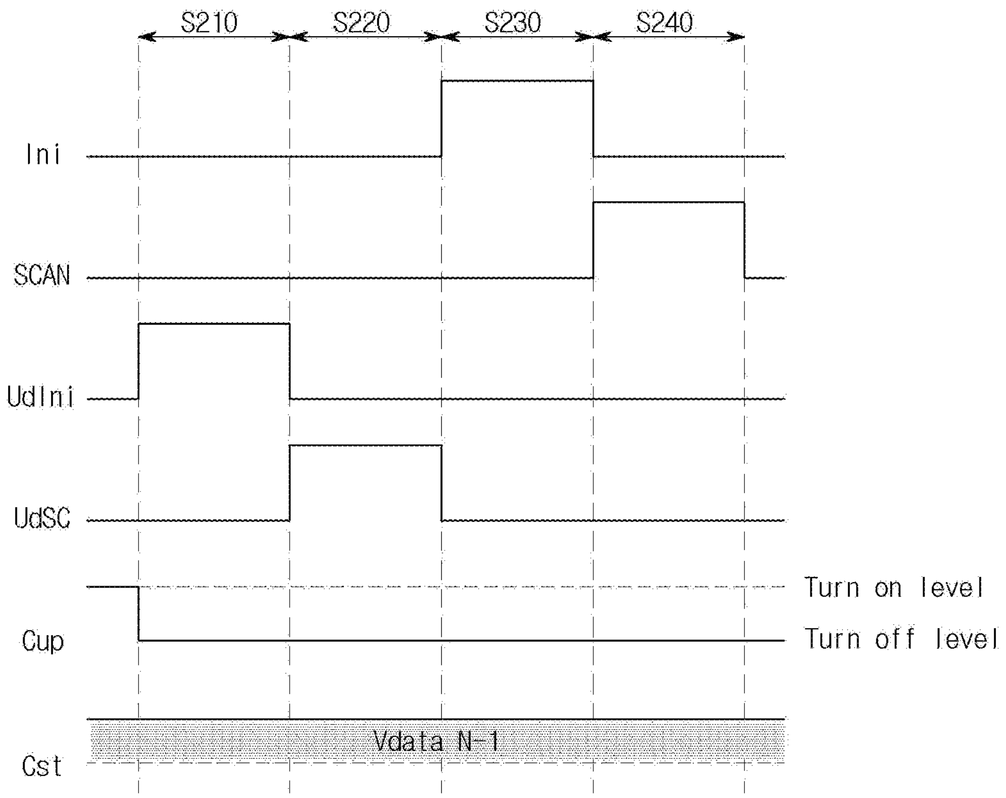
FIG. 14 is a view showing the timing for holding the sub-pixel according to the present disclosure.

FIG. 14 is a view showing the timing for holding the sub-pixel according to the present disclosure.

FIGS. 15 to 18 are views showing an operation of the sub-pixel held according to the timing of FIG. 14.

For example, the sub-pixels SP described in FIGS. 14 to 18 may be the sub-pixels SP11, SP12, SP13, SP14, SP15, SP21, SP25, SP31, SP35, SP41, SP42, SP43, SP44, SP45, SP51, SP52, SP53, SP54, and SP55 driven at low frequencies among the sub-pixels shown in FIG. 5 and may have the timings during the second period P2 and the third period P3 among the periods shown in FIGS. 6 to 8. The update voltage Vup applied to the sub-pixels during such a period is the turn-off level.

Referring to FIG. 14, periods S210, S220, S230, and S240 are shown.

Figure 15:
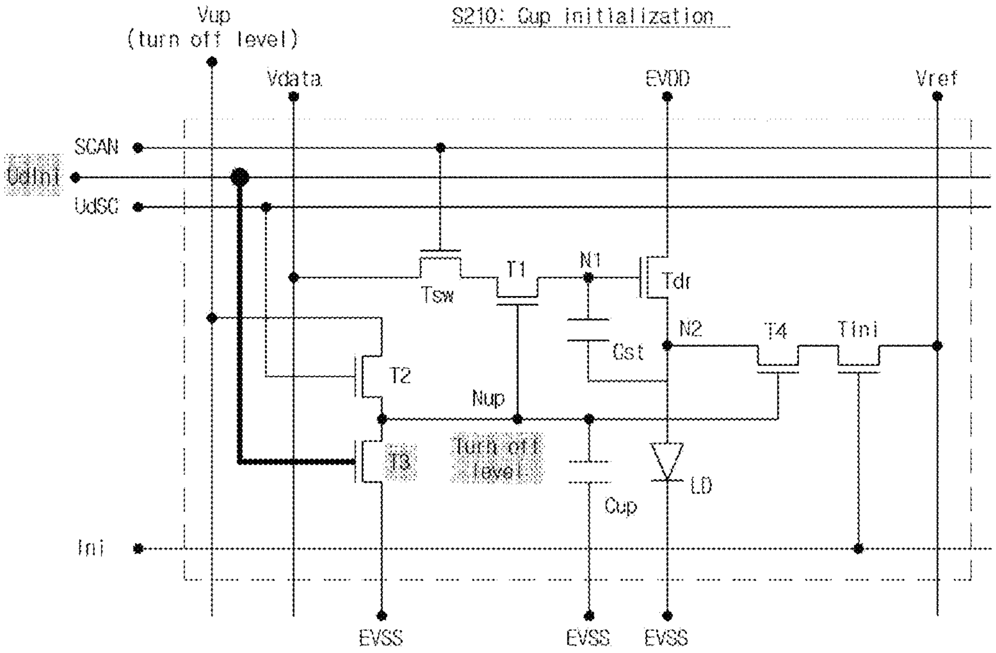
FIGS. 15 to 18 are views showing an operation of the sub-pixel held according to the timing of FIG. 14.

The first period S210 is a period for initializing the update capacitor Cup, and the state of the sub-pixel SP is shown in FIG. 15.

Figure 16:
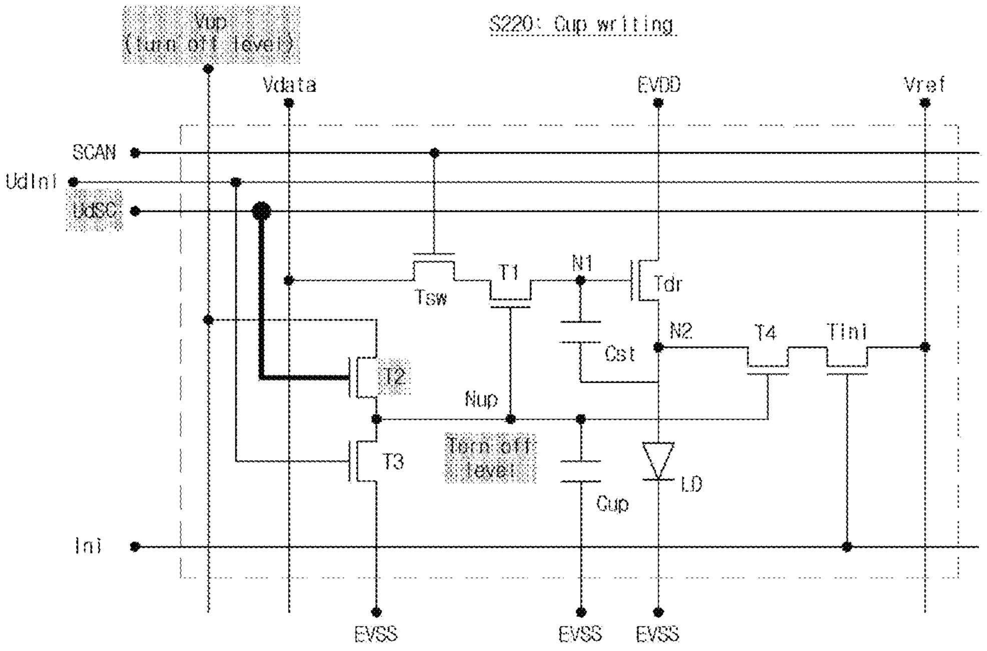

The second period S220 is a period in which the update voltage Vup is input to the update capacitor Cup, and the state of the sub-pixel SP is shown in FIG. 16.

Figure 17:
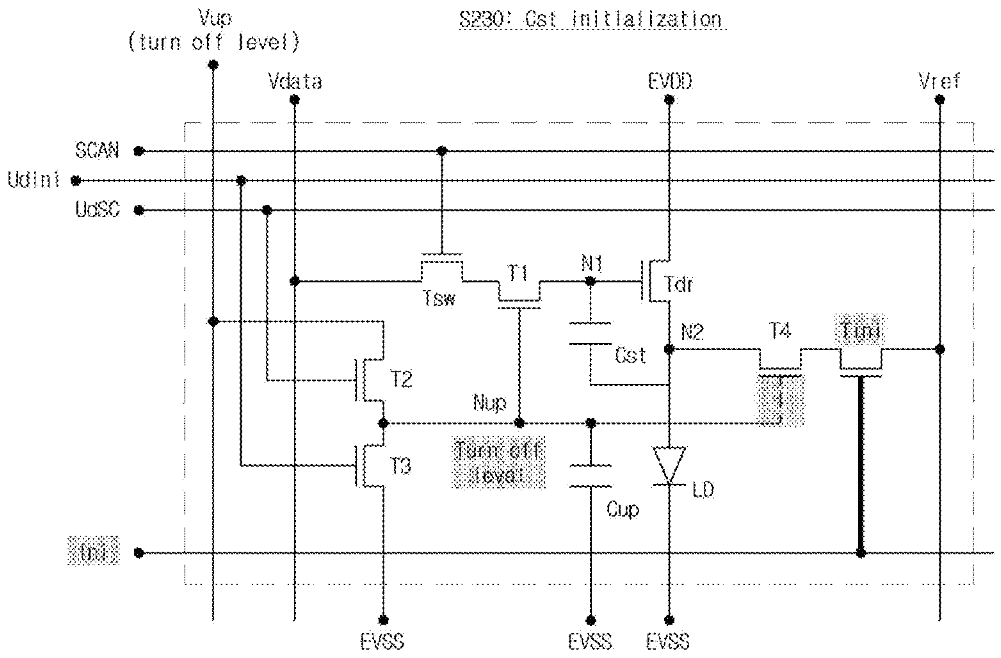

The third period S230 is a period for initializing the storage capacitor Cst, and the state of the sub-pixel SP is shown in FIG. 17.

Figure 18:
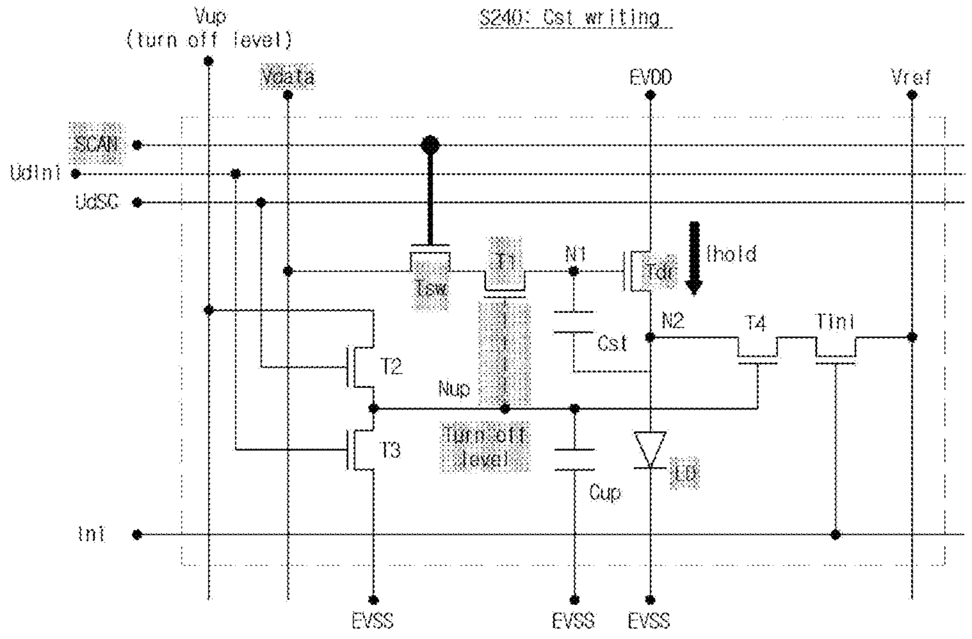

The fourth period S240 is a period in which the data voltage Vdata is input to the storage capacitor Cst, and the state of the sub-pixel SP is shown in FIG. 18.

Referring to FIG. 15, the update initialization signal UdIni is applied during the first period S210. The initialization signal UdIni turns on the third transistor T3. The low potential voltage EVSS is applied to the update node Nup through the third transistor T3. The update node Nup becomes the turn-off level by receiving the low potential voltage EVSS. The update capacitor Cup is initialized to the turn-off level.

Referring to FIG. 16, the update scan signal UdSC is applied during the second period S220. The update scan signal UdSC turns on the second transistor T2. The update voltage Vup is applied to the update node Nup through the second transistor T2. The update voltage Vup is the turn-off level. Therefore, the update node Nup becomes the turn-off level. The turn-off level voltage is applied to the update capacitor Cup.

Referring to FIG. 17, the initialization signal Ini is applied during the third period S230. The initialization signal Ini turns on the initialization transistor Tini. The update node Nup maintains the turn-off level voltage stored in the update capacitor Cup. Therefore, the fourth transistor T4 is turned off. Therefore, the reference voltage Vref is blocked at the second node N2 rather than being applied to the second node N2. The storage capacitor Cst may not be initialized and maintains the data voltage Vdata N−1 stored in the past.

Referring to FIG. 18, the scan signal SCAN is applied during the fourth period S240. The scan signal SCAN turns on the switching transistor Tsw. The update node Nup maintains the turn-off level voltage stored in the update capacitor Cup. Therefore, the first transistor T1 is turned off. Therefore, the data voltage Vdata is blocked at the first node N1 rather than being applied to the first node N1. The data voltage Vdata may not be applied to the storage capacitor Cst. For example, the new data voltage Vdata N may not be stored in the storage capacitor Cst, and the data voltage Vdata N−1 stored in the past is maintained. Since a current Ihold passing through the driving transistor Tdr is not the updated current but the same current as the current flowing in the past, the held image is displayed on the display panel 110.

According to the present disclosure, disclosed is a display device including a display panel including a plurality of sub-pixels, a data driver for outputting a data voltage and an update voltage to the display panel, a gate driver for outputting a scan signal and an initialization signal to the display panel, and a timing controller for outputting a timing control signal to the data driver and the gate driver, in which the update voltage is a signal swing between a turn-on level and a turn-off level.

The data voltage and the update voltage may be output through separate data lines.

The data voltage and the update voltage may be output asynchronously through the same data line.

The data voltage may be changed to a level corresponding to a gray value.

A period of 1 second may include a first period during which an update is performed and a second period during which holding is performed, and sub-pixels driven at a low frequency during the first period and the second period may receive a data voltage at the same level during the first period and the second period.

Sub-pixels driven at the high frequency may receive data voltages at different levels during a first period and a second period.

A portion of sub-pixels among the plurality of sub-pixels may be updated at a first frequency, and other sub-pixels among the plurality of sub-pixels may be updated at a second frequency.

The scan signal described above can be referred to as first scan signal, and the sub-pixel may further include a switching transistor for outputting the data voltage to a first node, a driving transistor controlled at a voltage at the first node to output a driving current to a second node, a storage capacitor disposed between the first node and the second node, a first transistor controlled by an update node and disposed between the switching transistor and the first node, a second transistor controlled by an update scan signal and disposed between the update voltage and the update node, and an update capacitor disposed between the update node and a low potential voltage.

When the update scan signal is applied, the second transistor may output the update voltage to the update node.

When the update voltage becomes the turn-on level, the first transistor may output the data voltage to the first node.

When the update voltage becomes the turn-off level, the first transistor may block the data voltage output to the first node.

The initialization signal described above can be referred to as a first initialization signal, and the sub-pixel may further include a third transistor controlled by an update initialization signal and disposed between the update node and the low potential voltage.

When the update initialization signal is applied, the third transistor may initialize the update node to the low potential voltage.

The sub-pixel may further include an initialization transistor controlled by an initialization signal and disposed between a reference voltage and the second node, and a fourth transistor controlled by the update node and disposed between the initialization transistor and the second node.

When the update voltage becomes the turn-on level, the fourth transistor may output the reference voltage to the second node.

When the update voltage becomes the turn-off level, the fourth transistor may block the reference voltage output to the second node.

The sub-pixel may further include a switching transistor for outputting the data voltage to a first node, a driving transistor controlled by a voltage at the first node to output a driving current to a second node, a storage transistor disposed between the first node and the second node, a first transistor controlled by an update node and disposed between the switching transistor and the first node, a second transistor controlled by an update scan signal and disposed between the update voltage and the update node, an update capacitor disposed between the update node and a low potential voltage, a third transistor controlled by an update initialization signal and disposed between the update node and the low potential voltage, an initialization transistor controlled by an initialization signal and disposed between a reference voltage and the second node, and a fourth transistor controlled by the update node and disposed between the initialization transistor and the second node.

When the update initialization signal is applied, the third transistor may be turned on to initialize the update node to the low potential voltage.

When the update scan signal is applied, the second transistor may be turned on to apply the update voltage at a turn-on level to the update node.

When the initialization signal is applied, the initialization transistor may be turned on, and the fourth transistor may be turned on by the update node at the turn-on level to apply the reference voltage to the second node.

When the scan signal is applied, the switching transistor may be turned on, and the first transistor may be turned on by the update node at the turn-on level to apply the data voltage to the first node.

The storage capacitor may be updated to a new data voltage.

When the update scan signal is applied, the second transistor may be turned on to apply the update voltage at a turn-off level to the update node.

When the initialization signal is applied, the initialization transistor may be turned on, and the fourth transistor may be turned off by the update node at the turn-off level to block the output of the reference voltage to the second node.

When the scan signal is applied, the switching transistor may be turned on, and the first transistor may be turned off by the update node at the turn-off level to block the output of the data voltage to the first node.

The storage capacitor may hold the past data voltage.

According to the present disclosure, the update initialization signal is applied to the sub-pixel. The update initialization signal may or may not initialize the update node.

According to the present disclosure, the update scan signal is applied to the sub-pixel. The update scan signal may apply or may not apply the update voltage to the update node by controlling the second transistor.

According to the present disclosure, the sub-pixel includes the update capacitor. The update capacitor can maintain the update voltage applied to the update node.

According to the present disclosure, the sub-pixel includes the first transistor. The first transistor may be controlled by the update node to supply or not supply the data voltage to the driving transistor. When the data voltage is supplied to the driving transistor, the corresponding sub-pixel is updated. When the data voltage is not supplied to the driving transistor, the corresponding sub-pixel is not updated to maintain the data voltage of the previous frame.

According to the present disclosure, the sub-pixel may or may not be updated. When the sub-pixel is updated, the part grouped by the corresponding sub-pixels may be driven at the high frequency. When the sub-pixel is not updated, the part grouped by the corresponding sub-pixels may be driven at the low frequency. Therefore, a portion of one screen may be driven at the high frequency, and the other may be driven at the low frequency. Therefore, the frequency driving for each part of the screen is possible.

The embodiments of the present disclosure have been described above with reference to the accompanying drawings. The present disclosure is not necessarily limited to the embodiments. The present disclosure may be modified variously without departing from the technical spirit of the present disclosure. Therefore, it should be understood that the embodiments of the present disclosure are for illustrative purposes rather than limiting the technical contents. The scope of the present disclosure should include those recited in the claims. In addition, all technical spirits within the equivalent scope of the claims should be construed as being included in the technical spirit of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including a plurality of sub-pixels;

a data driver configured to output one or more of a data voltage or an update voltage to the display panel;

a gate driver configured to output one or more of a scan signal or an initialization signal to a sub-pixel of the display panel; and a timing controller configured to output a timing control signal to the data driver and the gate driver, wherein the data voltage includes a voltage level corresponding to a gray value, and the update voltage includes a voltage level configured to swing between a turn-on level and a turn-off level, and wherein the sub-pixel includes:

a switching transistor for outputting the data voltage to a first node;

a driving transistor controlled by a voltage at the first node to output a driving current to a second node;

a storage capacitor disposed between the first node and the second node;

a first transistor controlled by a voltage at an update node and disposed between the switching transistor and the first node;

a second transistor controlled by an update scan signal and disposed between the update voltage and the update node; and an update capacitor disposed between the update node and a low potential voltage.

2. The display device of claim 1, wherein the data voltage and the update voltage are output through separate data lines.

3. The display device of claim 1, wherein the data voltage and the update voltage are output asynchronously through a same data line.

4. The display device of claim 1, wherein a driving period includes a first period and a second period, and a sub-pixel driven at a first frequency during the first period and the second period receive a data voltage of a same voltage level during the first period and the second period.

5. The display device of claim 4, wherein a sub-pixel driven at a second frequency higher than the first frequency receive data voltages at different levels during the first period and the second period.

6. The display device of claim 1, wherein a first sub-pixel among the plurality of sub-pixels is updated at a first frequency, and a second sub-pixel among the plurality of sub-pixels is updated at a second frequency.

7. The display device of claim 1, wherein, when the update voltage becomes the turn-on level, the first transistor outputs the data voltage to the first node, and when the update voltage becomes the turn-off level, the first transistor blocks the data voltage output to the first node.

8. The display device of claim 1, wherein the sub-pixel further includes a third transistor controlled by an update initialization signal and disposed between the update node and the low potential voltage, and when the update initialization signal is applied, the third transistor initializes the update node to the low potential voltage.

9. The display device of claim 1, wherein the sub-pixel further includes:

an initialization transistor controlled by an initialization signal and disposed between a reference voltage and the second node; and a fourth transistor controlled by the update node and disposed between the initialization transistor and the second node.

10. The display device of claim 9, wherein, when the update voltage becomes the turn-on level, the fourth transistor outputs the reference voltage to the second node, and when the update voltage becomes the turn-off level, the fourth transistor blocks the reference voltage output to the second node.

11. The display device of claim 1, wherein the sub-pixel further includes:

a third transistor controlled by an update initialization signal and disposed between the update node and the low potential voltage;

an initialization transistor controlled by an initialization signal and disposed between a reference voltage and the second node; and a fourth transistor controlled by the voltage at the update node and disposed between the initialization transistor and the second node.

12. The display device of claim 11, wherein, when the update initialization signal is applied, the third transistor is turned on to initialize the update node to the low potential voltage.

13. The display device of claim 12, wherein, when the update scan signal is applied, the second transistor is turned on to apply the update voltage at a turn-on level to the update node.

14. The display device of claim 13, wherein, when the initialization signal is applied, the initialization transistor is turned on, and the fourth transistor is turned on by the voltage at the update node at the turn-on level to apply the reference voltage to the second node.

15. The display device of claim 14, wherein, when the scan signal is applied, the switching transistor is turned on, and the first transistor is turned on by the voltage the update node at the turn-on level to apply the data voltage to the first node.

16. The display device of claim 12, wherein, when the update scan signal is applied, the second transistor is turned on to apply the update voltage at a turn-off level to the update node.

17. The display device of claim 16, wherein, when the initialization signal is applied, the initialization transistor is turned on, and the fourth transistor is turned off by the voltage at the update node at the turn-off level to block the output of the reference voltage to the second node.

18. The display device of claim 17, wherein, when the scan signal is applied, the switching transistor is turned on, and the first transistor is turned off by the voltage at the update node at the turn-off level to block the output of the data voltage to the first node.

19. A display device comprising:

a display panel including a plurality of sub-pixels;

a data driver configured to output a data voltage and an update voltage to a sub-pixel of the display panel; and a gate driver configured to control application of the data voltage to a sub-pixel of the plurality of sub-pixels through a first transistor and a second transistor in the sub-pixel, the first transistor configured to be switched on or off based on a scan signal, and the second transistor configured to be switched on or off based on the update voltage, wherein the sub-pixel includes:

a switching transistor for outputting the data voltage to a first node;

a driving transistor controlled by a voltage at the first node to output a driving current to a second node;

a storage capacitor disposed between the first node and the second node;

a first transistor controlled by a voltage at an update node and disposed between the switching transistor and the first node;

a second transistor controlled by an update scan signal and disposed between the update voltage and the update node; and an update capacitor disposed between the update node and a low potential voltage.

* * * * *